US 8,380,557 B2

(12) United States Patent
Moon et al.

(10) Patent No.: US 8,380,557 B2
(45) Date of Patent: Feb. 19, 2013

(54) MULTI-TENANT DATABASE MANAGEMENT FOR SERVICE LEVEL AGREEMENT (SLA) PROFIT MAXIMIZATION

(75) Inventors: Hyun Jin Moon, Newark, CA (US); Junichi Tatemura, Cupertino, CA (US); Vahit Hakan Hacigumus, San Jose, CA (US); Shenoda Guirguis, Pittsburgh, CA (US); Yun Chi, Monte Sereno, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 15 days.

(21) Appl. No.: 12/985,057

(22) Filed: Jan. 5, 2011

(65) Prior Publication Data
US 2012/0066020 A1 Mar. 15, 2012

Related U.S. Application Data

(60) Provisional application No. 61/377,605, filed on Aug. 27, 2010.

(51) Int. Cl.
*G06Q 10/00* (2012.01)
(52) U.S. Cl. ............. 705/7.28; 705/14.46; 705/705; 705/348; 705/26.2; 705/400; 705/7.22; 705/7.36; 705/7.38; 705/7.39
(58) Field of Classification Search ............ None
See application file for complete search history.

(56) References Cited

U.S. PATENT DOCUMENTS 7,756,989 B2 * 7/2010 Goldszmidt et al. ......... 709/229
7,783,759 B2 * 8/2010 Eilam et al. .................. 709/226
2008/0033774 A1 * 2/2008 Kimbrel et al. .................. 705/7
2008/0295096 A1 * 11/2008 Beaty et al. ..................... 718/1
2010/0306382 A1 * 12/2010 Cardosa et al. ............... 709/226

OTHER PUBLICATIONS

IBM, A Method and System for Cost Optimal Placement of Vritual Machines under Security Constraints, IPCOM000180995D, Mar. 23, 2009 http://ip.com/pdf/ipcompad/IPCOM000180995D.pdf.*
Bobroff et al, Dynamic Placement of Virtual Machines for Managing SLA Violations, IEEE 142440799007, 2007 http://ieeexplore.ieee.org/stamp/stamp.jsp?tp=&arnumber=4258528&tag=1.*
Hacigumus Hakan, Privacy in Database-as-a-Service Model, dissertation, University of California 2003.*
Han et al, SLA-Constrained Policy Based Scheduling Mechanism in P2P Grid, 2006 http://ieeexplore.ieee.org/stamp/stamp.jsp?tp=&arnumber=4023054.*
Hui er al, Supporting Databse Applications as a Service, IEEE 1084462709, IEEE, 2009.*
Hyun Jin Moon, Supporting Schema Evolution nin Information Systems and Historical Databases, University of California, dissertation, 2008.*
Khamma et al, Application Performance Management in Virtualized Server Environments, IEEE, 142440143706, 2006 http://ieeexplore.ieee.org/stamp/stamp.jsp?tp=&arnumber=1687567.*
Liu et al, on Maximizing Service Level Agreement Profits, OEC 01, ACM 1581133871010010, Oct. 2001 http://dl.acm.org/citation.cfm?id=501185.*
Peha et al, A cost-based scheduling alghorithm to support Integrated Services, CH297939100000741, IEEE, 1991 http://ieeexplore.ieee.org/stamp/stamp.jsp?tp=&arnumber=147579.*

(Continued)

*Primary Examiner* — Romain Jeanty
*Assistant Examiner* — Octavian Rotaru
(74) *Attorney, Agent, or Firm* — Joseph Kolodka

(57) ABSTRACT

Systems and methods are disclosed to consolidate workload on cloud-based computers by co-locating one or more high-penalty tenants on one or more cloud-based servers; reducing service level agreement (SLA) violations by over-provisioning the cloud-based server; and maximizing an SLA profit.

20 Claims, 4 Drawing Sheets

OTHER PUBLICATIONS

Zang Jian, Learning Aided System Performance Modeling in Support of Self-Optimized Resource Scheduling in Distributed Environments, Dissertation, University of Florida, 2007.*

Xiaoyun Zhu, Don Young, Brian J. Watson, Zhikui Wang, Jerry Rolia, Sharad Singhal, Bret McKee, Chris Hyser, Daniel Gmach, Rob Gardner, Tom Christian, Lucy Cherkasova, 1000 Islands: Integrated Capacity and Workload Management for the Next Generation Data Center, International Conference on Autonomic Computing, 2008.

Bobroff, N.; Kochut, A.; Beaty, K. Dynamic Placement of Virtual Machines for Managing SLA Violations, Integrated Network Management, 2007. IM '07. 10th IFIP/IEEE International Symposium on , vol., no., pp. 119-128, 2007.

* cited by examiner

MULTI-TENANT DATABASE MANAGEMENT FOR SERVICE LEVEL AGREEMENT (SLA) PROFIT MAXIMIZATION

This application claims priority to U.S. Provisional Application Ser. No. 61/377,605 filed Aug. 27, 2010, the content of which is incorporated by reference.

BACKGROUND

This application relates to Multi-tenant Database Management for SLA Profit Maximization.

In recent years, there has been great interests in exploiting the cloud as a platform for database as a service. As with other cloud-based services, database services may enjoy cost efficiency through consolidation: hosting multiple databases within a single physical server. A number of multi-tenant schemes have been used:

Private virtual machine—Using virtual machine technology, multiple virtual machines can be hosted on a single physical machine. Each virtual machine, however, hosts only a single database tenant. This option gives a good isolation across tenants, but there is virtual machine (VM) performance overhead and also the number of VMs that can be hosted within a physical machine is limited.

Private DB instance—Within a physical machine, multiple database instances are run and each tenant use one database instance. Running a DB instance involves a high memory overhead, so this option has limited scalability.

Private database—Database management system (DBMS) can allow multiple databases to be created within a single instance. Hence each tenant can have its own database while sharing the DB instance. In many of DBMS offerings, each database usually comes with its own buffer pool, so memory isolation is well implemented with this scheme. However, each database has a relatively high memory overhead, which limits the number of tenants for a physical server.

Private table—In this scheme, multiple tenants share a database, while each tenant uses its own set of tables. This scheme is attractive for its relatively low memory overhead of each table compared to that of a database mentioned above, i.e. 4 KB per table in DB2, and 9 KB per table in MySQL. However, at higher scale, this scheme also suffers from memory overhead. Users have reported a significant performance degradation on a blade server when the number of tables rises beyond 50,000, mainly due to i) memory overhead of per-table metadata, and ii) buffer space waste due to per-table page loading.

Shared table—This is the most scalable scheme, since DBMS is specially designed for big tables. Packing many tenants into a single table to create a big table can nicely exploit the DBMS' inherent capability. The main challenge, however, is the heterogeneity of schemas across tenants, which requires a solution for putting them together into a single table.

Multitenant DBMS—This approach uses a new shared-table approach called Chunk Folding. The private table approach may be the ideal option for SaaS database systems in today's DBMS technology. The shared table approach can be based on the universal table and storage and indexing techniques allow for efficient query processing.

New offerings of database-as-a-service, such as Amazon RDS and Microsoft SQL Azure consolidate multiple small databases, or tenants, within a single physical server. The main goal is to reduce operational cost, and to improve business profit. While consolidation is an important and beneficial technique in multitenant database (MTDB), it raises a unique challenge, namely performance isolation. As in any other resource-sharing systems, e.g. virtual machines (VMs) sharing a physical machine, performance isolation is an important and difficult problem in MTDB: one tenant with (temporarily) high resource consumption may hurt neighbors' service quality. Naturally, there has been a large body of research effort for performance isolation, especially in VM consolidation. They focus on performance isolation in terms of low-level metric, such as response time, or higher-level metric such as violations of service level agreements (SLAs). From service providers' perspective, however, business profit is the most important optimization criteria in general, and unfortunately this has not been considered in either VM consolidation or MTDB management systems.

Salesforce provides Platform-as-a-Service (PaaS), called Force.com, which allows developers develop their applications using the provided database service. In this environment, multiple tenants share tables creating a few very large tables. They modify RDBMS and the query optimizer to facilitate highly efficient query processing on those large shared tables, while the optimization techniques are proprietary. Microsoft offers SQL Azure, which hosts multiple MS SQL Server within a physical server. They address several performance issues to support multitenant DBMS, such as consolidated logging across multiple tenants. However they do not support any performance service level agreements (SLAs). Aggressive consolidation, however, may hurt the service quality, leading to SLA violation penalty, which in turn reduces the total business profit, called SLA profit. While consolidation helps to reduce operational cost, too aggressive consolidations may increase SLA violation penalty due to the crowded environment, which leads to the reduced total profit.

SUMMARY

In one aspect, systems and methods are disclosed to consolidate workload on cloud-based computers by co-locating one or more high-penalty tenants on one or more cloud-based servers; reducing service level agreement (SLA) violations by over-provisioning the cloud-based server; and maximizing an SLA profit.

In another aspect, multi-tenant database management in the cloud for SLA profit maximization is disclosed. The SLA profit-aware system provides database tenant placement and capacity planning, based on a model for expected penalty computation in the multitenant servers.

In another aspect, systems and methods are disclosed for expected SLA penalty computation when consolidating multiple database tenants into a single server.

In yet another aspect, systems and methods are disclosed for SLA profit-aware tenant placement.

In a further aspect, systems and methods are disclosed for SLA profit-aware multitenant database capacity planning.

Advantages of the preferred embodiments may include one or more of the following. The systems considers SLA profit maximization in VM consolidation. The system supports flexible scheduling policies. The system controls the placement of stateful tenants, since future query dispatching and scheduling depend on the placement. The system provides MTDB management techniques that are orthogonal to the DB sharing schemes, i.e. tenant placement and capacity planning problem, allowing DSPs' to freely choose the best sharing scheme for their tenants, considering scalability and isolation requirements. The MTDB system can maximize business profit. The system serves small tenants using the cloud resources: servers are rented from IaaS (Infrastructure-as-a-Service) providers, such as Amazon EC2, to provide database-as-a-service to the public. The system focuses on maximizing SLA profit, which is equal to SLA revenue that service providers make from the clients, minus the operational cost, such as the server operation cost. The system can efficiently manage many tenants with different types of workloads (i.e. query types and query arrival patterns) and different types of SLAs. The system maximizes profit by: i) given N servers, how to consolidate databases such that the SLA penalty is minimized and hence the total profit is maximized (i.e. tenant placement problem), and ii) how many servers should be used to maximize the total profit (i.e. capacity planning problem) in an MTDB environment.

DESCRIPTION

Figure 1:
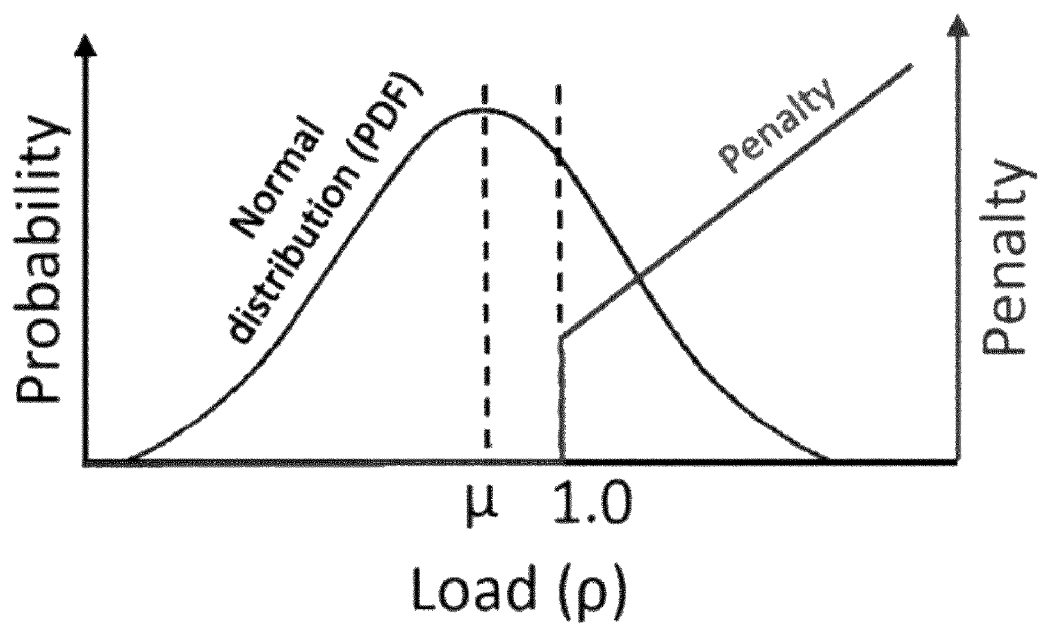
FIG. 1 shows an exemplary multi-tenant aggregated load distribution for a server and a penalty function.

FIG. 1 shows an exemplary multi-tenant aggregated load distribution for a server and a penalty function. For a given server with one or more tenants, the aggregated load distribution is shown as a bell curve, where the mean ($\mu$) is the sum of load means of all tenants, and the variance ($\sigma^2$) is the sum of load variances of all tenants. The SLA penalty of a server is modeled as the violation of all queries' SLAs with overload (load>1.0) and zero with underload (load<1.0). By integrating these probabilities and the penalty function, the expected penalty value of the server can be determined. When tenants $i_1$ through $i_2$ are placed within a single server, its expected penalty is denoted as ExpPenalty($i_1$, $i_2$). Based on this expected penalty computation, tenant placement and capacity planning can be done, as described in the flowcharts of FIGS. 2 and 3 below.

To perform tenant placement in an SLA profit-aware manner, the system places tenants based on the penalty level: intuitively speaking, the system co-locates high-penalty tenants together on a server, and tries to reduce the chance of SLA violation by over-provisioning. In short, the system generates a model for expected penalty estimation and applies a method for tenant placement such that the total expected penalty is minimized. Dynamic programming is used to design an efficient placement method called P-MAX (Profit-MAXimizing tenant placement policy), which has O($N^2M$) time complexity, given N tenants and M servers. P-MAX placement constructs a table of MTC[i,j], where each cell stores the min total cost for i tenants and j servers. By examining MTC[N,j], the system can determine an expected penalty cost when j servers are used for N tenants. The information to estimate the SLA penalty cost of using j servers, and by subtracting the operational cost associated with j servers, the system can decide the best capacity size.

P-MAX aims at better prioritization of tenants with different SLAs. The system groups tenants by penalty values: high penalty tenants together and low penalty tenants together. In P-MAX, such grouping can be found by sorting tenants by their SLA penalty values and finding the optimal cuts, as many as M-1, given M servers. A set of cuts are called optimal if it minimizes the sum of all expected penalty values from M servers, among all possible sets of cuts. P-MAX uses an efficient dynamic programming-based algorithm.

In the P-MAX process, C($i_1$, $i_2$) is the expected SLA cost when colocating tenants $i_1$ through $i_2$ within a single server. With dynamic programming, the system constructs and fills a N×M table, where N is the number of tenants and M is the number of servers. Each cell stores two information, MTC[i, j] and PrevCut[i, j]. MTC[i, j] is the minimum total cost possible when placing i tenants on j servers. PrevCut[i,j] tells where the previous cut is, for the setup that realizes the minimum total cost. For example, PrevCut[100,10]=85 means that given one hundred ordered tenants and ten servers, the system needs to put a cut after the tenant 85 (i.e. put tenants 86 through 100 in the last single server).

Figure 2:
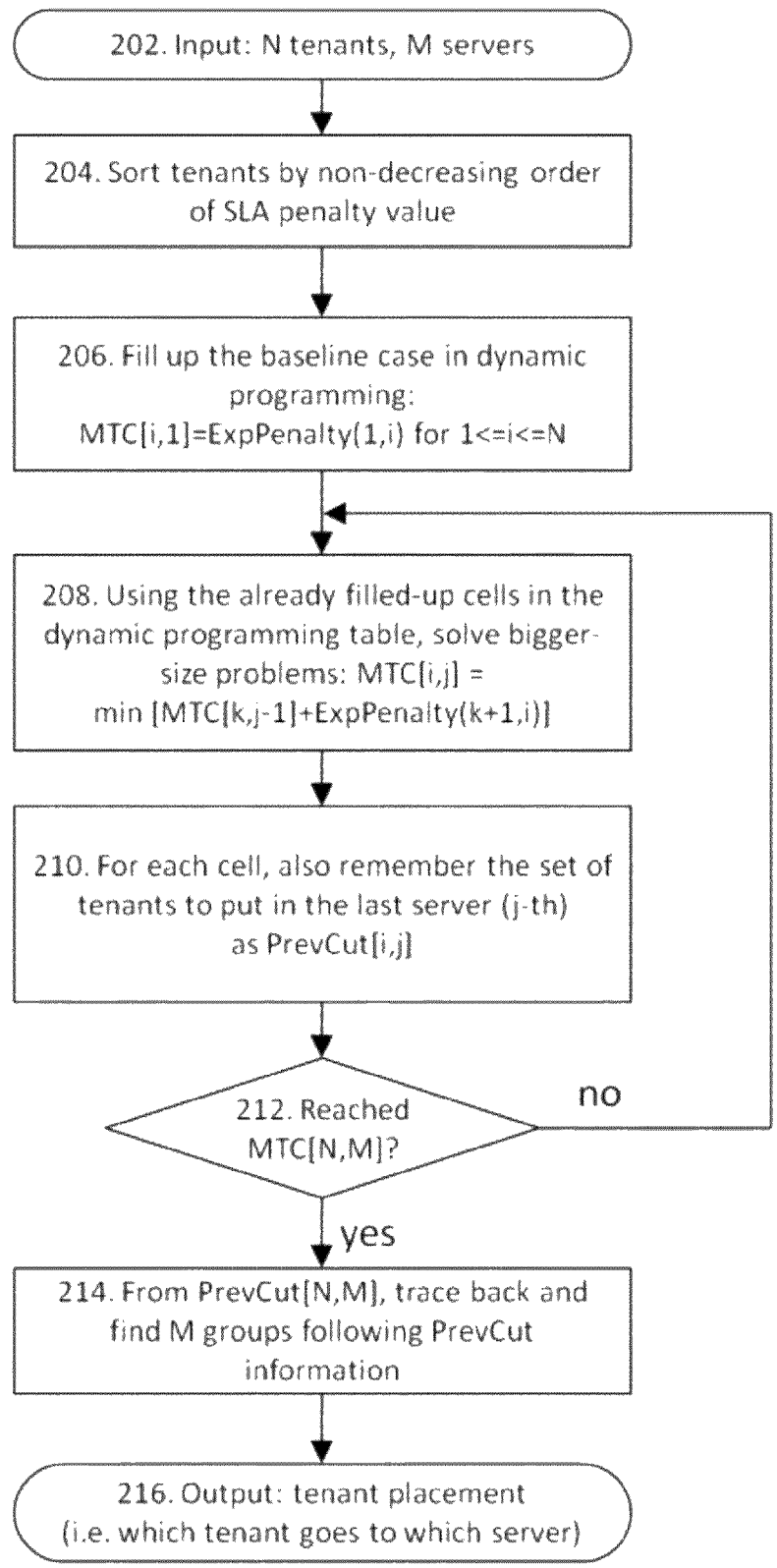
FIG. 2 shows an exemplary flowchart for a P-MAX process.

FIG. 2 shows an exemplary flowchart for a P-MAX process. In FIG. 2, given N servers, the process determines how to consolidate databases such that the SLA penalty is minimized and hence the total profit is maximized (i.e. tenant placement problem). The process also determines how many servers should be used to maximize the total profit (i.e. capacity planning problem) in a multitenant database environment.

The process of FIG. 2 receives as input the number of tenants and servers (202). The process sorts tenants by a non-decreasing order of SLA penalty value (204). Next, the process fills a baseline case in a dynamic programming table with MTC [I, 1]=ExpPenalty (1,i), 1≦i≦N (206). Using the filled up cells in the dynamic programming table, the process solves a bigger sized problem expressed as MTC[i, j]=min [MTC[k, j−1]+ExpPenalty (k+1, i)] (208). For each cell, the process stores the set of tenants to put in the server (j-th) as PrevCut[i, j] (210). The process determines whether all tenants N and servers M have been processed in 212, and if not, the process loops back to 208. Alternatively, the process uses PrevCut[N, M] and traces M groups following the PrevCut information (214). The output is a tenant placement determination of which tenant is assigned to which server (216).

An exemplary pseudo-code for P-MAX is as follows:

```
Input  : Tenants sorted by the non-increasing order of
         SLA penalty; labeled i=1 to N
Input  : Servers; labeled j=1 to M
Output: Cuts[j]; M−1 cuts among the sorted tenants
for i ← 1 to N do
 |  MTC[i, 1] ← C(1, i);
end
for j ← 2 to M do
 |  for i ← j to N do
 |   |  l ← argmin_{1≦Re≦i−1} (MTC[k, j − 1]+C(k + 1, i))
 |   |  (1);
 |   |  PrevCut[i, j] ← l;
 |   |  MTC[i, j] ← MTC[l, j − 1]+C(l + 1, i);
 |  end
end
Cuts[M − 1] ← PrevCut[N, M];
for j ← M − 2 to 1 do
 |  Cuts[j] ← PrevCut[Cuts[j + 1], j + 1];
end
```

Example: Assume that the optimal solutions (i.e. cuts) are known with MTC[1,2], i.e. placement of tenant 1, using two servers, MTC[2,2], i.e. placement of tenants 1 and 2, using two servers, and MTC[3,2], the placement of tenants 1 through 3, using two servers. With these optimal solutions for the three subproblems, the optimal solution for MTC[4,3] for the placement of tenants 1 through 4, can be done using three servers. There are three possible options for the optimal solution: i) placing tenants 1 using the first two servers, and placing the rest of tenants (i.e. 2 through 4) on the last server, ii) placing tenants 1 and 2, using the first two servers, and the rest of tenants (i.e. 3, 4) on the last server, and iii) placing tenants 1 through 3, using the first two servers, and the tenant 4 on the last server.

In each option, the solution for the first part, which uses the first two servers, is precomputed and the system can simply lookup the table, i.e. MTC[1,2], MTC[2,2], MTC[3,2], respectively. The second parts, which uses the last server, are the new information needed to compute using C(2,4), C(3,4), and C(4,4), respectively. In each option, the first and second parts are summed, i.e. MTC[1,2]+C(2,4), MTC[2,2]+C(3,4), and MTC[3,2]+C(4,4), respectively, to find the total expected penalty from the option. After evaluating all three options, the one that produces the minimum expected penalty is chosen, and this becomes the minimum penalty for placing tenant 1 through 4, using three servers, or MTC[4,3].

For instance, if the option ii) above gives the lowest expected penalty among three options. In this case, MTC[4,3]=MTC[2,2]+C(3,4). Also the system remembers where the last cut should be. Thus, the optimal solution of MT C[4,3] can be determined as it is behind the tenant 2 in this case. This is stored as PrevCut[4,3]=2.

By repeating the process described in the above example, the system iteratively fills the cells in the DP table. In the end, the system computes MTC[N,M], and more importantly, the system can find all cuts by following PrevCut[i, j] in the backward direction, starting from PrevCut[N,M], which gives the optimal solution. When there are multiple resource demands, $C(i_1,i_2)$ is extended as follows. For each resource dimension, the system evaluates the expected penalties from each resource dimension, and takes the max of them because it is the most contended resource type that determines the performance and expected penalty in that server.

In an exemplary multitenant DB architecture, a multitenant middleware at each server decides the scheduling decisions. In a runtime system architecture, clients send query workload to a middleware, which is responsible for rewriting, dispatching, and scheduling the query. Since multi-tenant DB's may modify the data schema of individual tenants (e.g. table names appended with tenant ID's in case of private table approach further described in the following section), the system slightly rewrites the queries. After that, a dispatcher looks up the placement plan, which is essentially the directory information that maps each tenant to a physical server, and routes the query to the server. An external query scheduler is used before the DB server. The external queue employs cost-based scheduling that intelligently makes a scheduling decision for SLA profit maximization. There is a variety of cost-based scheduling one can choose from, such as a static priority scheduling, EDF (Earliest Deadline First), HDF (Hierarchical Deadline First), FirstReward, CBS and CBS.

SLAs in general may be defined in terms of various criteria, such as service latency, throughput, consistency, security, among others. One embodiment focuses on service latency, or response time. With response time, there can be multiple specification methods, i) based on the average query response time, ii) based on the tail distribution of query response times, or iii) based on individual query response times.

In one system, each tenant has one or more query classes, where each query class has a unique SLA and one or more queries associated. In other words, all queries in the same query class shares a single SLA and a SLA revenue function, which defines a revenue for the achieved response time, from service provider's viewpoint.

As to the operational cost of running the service delivery infrastructure, the unit of operational cost is a server cost per hour. Consequently, the total operational cost is the sum of individual server costs for a given period of time. The individual server cost is the aggregation of all specific costs items that are involved in operating a server, such as energy, administration, software, among others.

Given an SLA revenue function, the system maximizes the profit:

$$\text{Profit} = \sum_i r_i - OpCost$$

where $r_i$ is the revenue generated by a query i, while OpCost is the operational cost. Dropping/increasing service levels cause loss/increase in the revenue. Likewise, increasing the amount of infrastructure resources to increase service levels results in increased operational cost. As a result, a problem for the provider is to come up with optimal service levels that will maximize its profits based on the agreed-upon SLAs. Further, given the SLA revenue function, R(x), defined as above, the SLA penalty cost function, C(x), is:

$$C(x)=R_0-R(x)$$

Profit maximization based on R(x) is equivalent to minimizing SLA penalty cost based on C(x).

Next, Cost Based Scheduling is discussed. Within a server, queries from multiple queries form a queue waiting for query execution, which is managed by a multitenant management middleware. Two scheduling policies for the queue can be used: First-Come First-Served (FCFS) and Cost-based Scheduling (CBS). FCFS is a straightforward scheduling policy used in many real world systems. CBS is a scheduling policy originally developed for packet transmission scheduling within network community. Each packet (or job, or query) carries a cost function that specifies the penalty cost C(t) if its processing is finished by time t. Informally speaking, at each scheduling, CBS examines each job to see how much extra cost will be incurred if it's not scheduled immediately, and then choose the job with the highest extra cost. CBS gives a higher priority to the queries with high SLA penalty, so it helps reducing SLA penalty cost in general, compared with FCFS.

Next, a tenant placement policy called P-MAX-CBS is discussed. P-MAX-CBS spreads least important (i.e. low-penalty) tenants across servers, roughly speaking, so that lowest-penalty queries get sacrificed in each server, if any query has to be sacrificed due to the overload. Cost-based scheduler, e.g. CBS, at each server assigns high priority to high-penalty queries and ensure that low priority queries get hurt first at the system overload.

In P-MAX-CBS, the system sorts tenants in the order of non-decreasing SLA penalty values of tenants. The SLA penalty of a tenant is computed as the weighted average of queries' SLA penalties. The system places one tenant at time, using the WorstFit algorithm based on resource demand: choose the server which leaves the largest amount of residual resources after placing the given tenant. Since the system has multiple resources (i.e. CPU, I/O, memory), vector packing is used: at server j, the minimum residual amount, $MinRes_j$, is determined among multiple resource types. The system chooses the server with the highest $MaxRes_j$.

Preferably, the system places lowest-penalty tenants first, since they affect the quality of tenant placement the most. As explained above, CBS sacrifices the lowest-penalty tenant first within a server when there's an overload. For this reason, the system ensures that each server has some low-penalty tenants.

The foregoing discussion are abouth SLA-profit aware placement given N tenants and M servers. In another embodiment, the capacity size, M, is not a fixed number and can be flexibly tuned, since the system can easily scale-in and -out the resource capacity leveraging IaaS such as Amazon EC2, on an hourly basis.

Another embodiment selects the capacity size M for the given N tenants in an SLA profit-aware manner. The best capacity size M is the one that maximizes Profit(M)-OpCost (M), where Profit(M) is the total SLA profit from M servers and OpCost(M) is the operational cost from M servers. While OpCost(M) is often described as the closed-form function of M, e.g. $0.10 per server per hour, it is much harder to capture Profit(M) as a closed form function. This embodiment uses the iterative-search approach: the system places the tenants using P-MAX-CBS for one particular value of $M_1$, and evaluates Profit($M_1$)-OpCost($M_1$), and tries $M_2$, $M_3$, ..., until the system finds the capacity that produces the maximized Profit (M)-OpCost(M).

In one embodiment, the system chooses the capacity M using the following method: begin with the server capacity $M_1$ such that the total load of all tenants uses 100% of the server capacity. After that increase the server size by 1, and see if Profit(M)-OpCost(M) has increased. This is repeated until the test fails, and the system returns M that maximizes it. Profit can be determined as:

Profit(*M*)=SLAIncome(*M*)−SLAPenalty(*M*), where SLAIncome(M) is a fixed constant for the given N tenants.

To estimate SLAPenalty(M), the system can simulate query traces of multiple tenants using a single server environment. This may yield a more accurate result than the model-based estimation, but it comes at the cost of simulation performance overhead. To avoid the need to perform estimation for many different M configurations, one embodiment uses a probabilistic model that provides an effective and efficient method for expected penalty estimation for a server with multitenants. This can be done by modelling the server aggregate load based on the tenant loads as a probability distribution function, $f_j(\rho)$, for the server j and the load $\rho$. The penalty value for the given aggregate load, Penalty ($\rho$) is similarly modeled. Based on these two models, the expected penalty value for the server j can be determined.

Incremental Arrival of Tenants is discussed next. While a database service provider may have a large number of tenants that need to be placed on servers, it is often possible to have additional set of tenants arriving later. For example, database service providers may see 10 additional tenants every day, who need to be placed as well. An incremental placement process can be used as the best effort given that the system does not allow relocation of existing tenants. In this embodiment, $C(i_1, i_2)$, which computes the expected penalty within a server given tenants $i_1$, $i_1$+1, ..., $i_2$ is replaced by a new function $C'(j,i_1,i_2)$ that computes the expected penalty on a server j with existing tenants, ExistingT enants[j], when the system assigns new tenants through $i_2$.

In some cases, especially in the cloud computing, where one may use Infrastructure-as-a-Service, the capacity size can be flexibly decided for optimization. In the following, P-MAX is extended to piggyback capacity planning on placement in an efficient manner. When the system fills the M×N table, it iterates column by column. After the completion of j-th column, the result is MTC[N,j], which is the minimum SLA penalty for placing N tenant onto j servers. Then SLA Penalty is determined for placing N tenants onto j servers as follows:

$$SLAProfit_N[j] = SLARevenue(N, j) - OpCost(j)$$

$$= SLAIncome(N) - MTC[N, j] - OpCost(j)$$

where SLAIncome(N) is the sum of SLA incomes from all tenants' queries, regardless of placement, and OpCost(j) is the operational cost for using j servers, such as j times the unit server cost. This is added to the end of each column, building a single dimension array of $SLAProfit_N[j]$. Also, each time a new $SLAProfit_N[j]$ value is determined, the system checks to see if it has increased compared to $SLAProfit_N[j-1]$, and stops when $SLAProfit_N[j]<SLAProfit_N[j-1]$, and decides j−1 as the best capacity size. In this implementation, the local maximum is the global maximum, which works well for general workloads characteristics. The complexity of capacity planning is $O(N^2 M_{opt})$, where $M_{opt}$ is the optimal capacity size.

Figure 3:
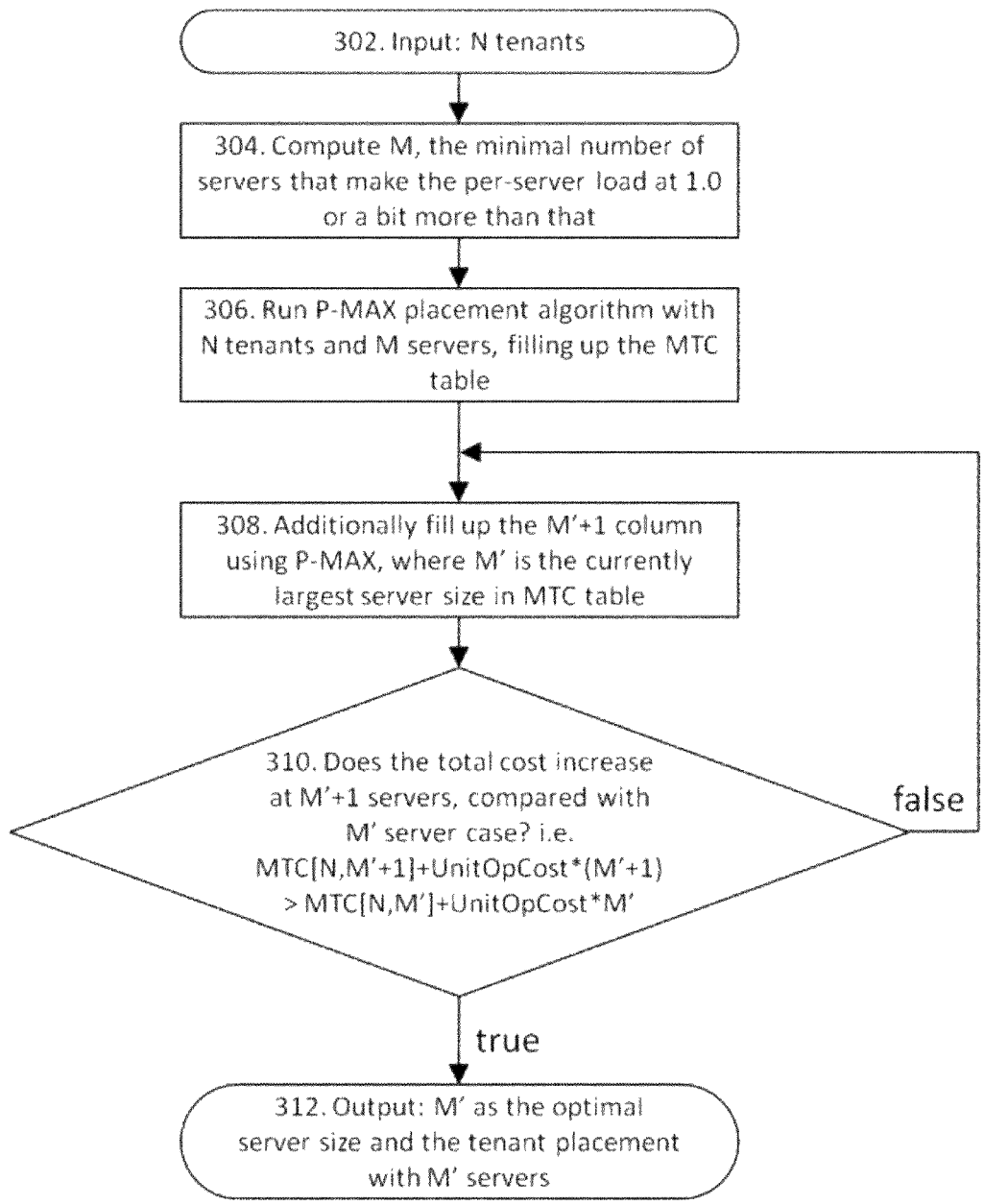
FIG. 3 shows an exemplary flowchart for SLA profit-aware Multi-tenant Database Capacity Planning

FIG. 3 shows an exemplary flowchart for SLA profit-aware Multi-tenant Database Capacity Planning Tenants are placed based on the penalty level: the process co-locates the high-penalty tenants together on a server, and reduces the chance of SLA violation by over-provisioning. One implementation generates a model for expected penalty estimation, and tenant placement is done with the model such that the total expected penalty is minimized.

Turning now to FIG. 3, the process receives as input the number of tenants (302). The process computes M, the minimal number of servers that supports a per-server load at approximately one (304). Next, the P-MAX process of FIG. 2 is used with N tenants and M servers to fill up the MTC table (306). The process then fills up an M'+1 column using P-MAX, where M' is the largest current server size in the MTC table (308). Next, the process compares the total cost increase for M'+1 servers with the total cost for M' server case (310). If the cost for M'+1 servers is less than or equal to M' server case, the process loops back to 308. Alternatively, the process exits and provides M' as the optimal server size and the tenant placement for the M' servers (312).

The system for SLA profit-aware tenant placement is new because prior arts consider lower-level metric-based placement without considering the optimization of profit. It is not known that whether optimizing lower level systems metrics automatically and always result in optimizing the profit, and conventional systems cannot show that direct relationship. Further, the method for SLA profit-aware multitenant database capacity planning differs from conventional systems which uses load-threshold-based capacity planning, e.g. acquire a new server when the current servers get 90% saturated. This process typically relies on human expertise in an ad hoc manner. In contrast, the systems described herein achieve capacity planning in an analytical and repeatable way.

Figure 4:
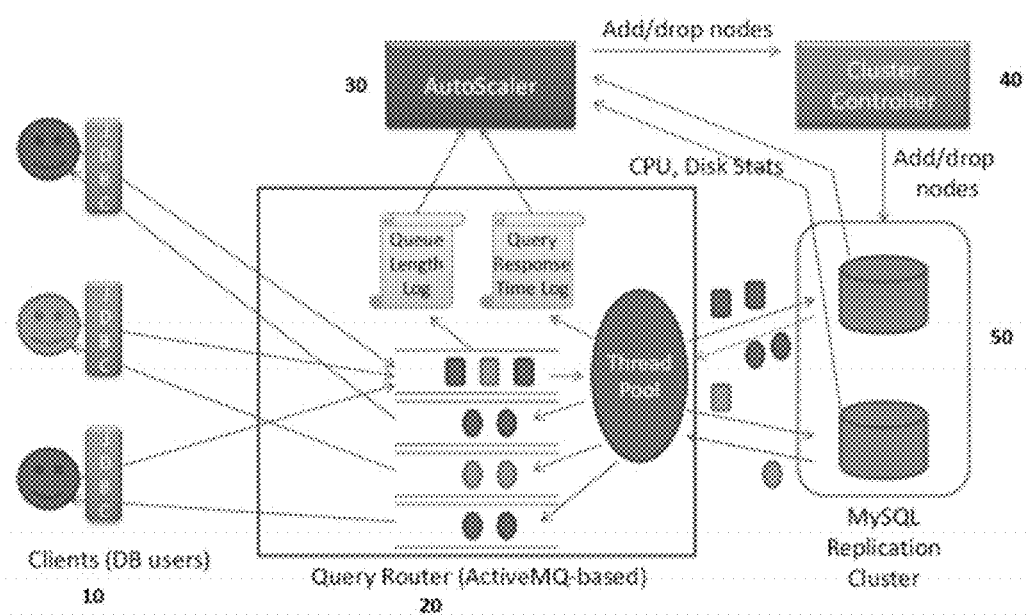
FIG. 4 shows an exemplary system to manage large cloud service delivery infrastructures.

FIG. 4 shows an exemplary system to manage large cloud service delivery infrastructures. The system architecture focuses on components that are relevant and subject to optimization to achieve the goal of SLA-based profit optimization of resource and workload management in the cloud databases. The use of distinctively optimizing individual system components with a global objective in mind provides a greater degree of freedom to customize operations. This approach yielded higher degrees of performance, customizability based on variable business requirements, and end-to-end profit optimization.

In one embodiment, clients 10 communicate with a query router 20. An autoscaler 30 monitors the queue length log and query response time log and determines if additional nodes should be added by an add/drop controller 40. The controller issues commands to add/drop nodes to a database replication cluster 50 such as a MySQL replication cluster. Although the system of FIG. 4 shows specific product names, such as MySQL and Active MQ, for example, the system is not limited to those products. For example MySQL can be replaced with other database products such as Oracle, among others.

The system has a Client Data Module that is responsible for maintaining client specific data such as cost functions and SLAs, which are derived from client contracts. Once captured, this information is made available to other system modules for resource and workload management purposes. An Manager monitors the status of system, e.g. system load, queue lengths, query response time, CPU and I/O utilization. All this information is maintained by the System Data module. Based on system monitoring data the Manager directs the Cluster Manager to add or remove servers from/to Resource Pool to optimize the operational cost while keeping the SLA costs in check. The Manager also provides the dispatcher and scheduler modules with the dynamic system data. An Online Simulator is responsible for dynamic capacity planning It processes the client data and dynamic system data to assess optimum capacity levels through simulation. It has capabilities to run simulations both in offline and online modes. A Dispatcher takes incoming client calls and immediately forwards the queries (or jobs) to servers based on the optimized dispatching policy. The dispatching policy is constantly tuned according to dynamic changes in the system, such as user traffic, addition/removal of processing nodes. A Scheduler decides the order of execution of jobs at each server. After the client requests are dispatched to individual servers based on the dispatching policy, individual scheduler modules are responsible for prioritization of dispatched jobs locally by forming a queue of queries, from which a query is chosen and executed in the database. The choice of which query to execute first makes a difference in the SLA penalty costs observed.

The system uses an SLA-based profit optimization approach for building and managing a data management platform in the cloud. The problem of resource and workload management is done for a data management platform that is hosted on an Infrastructure-as-a-Service (IaaS) offering, e.g., Amazon EC2. The data management platform can be thought of a Platform-as-a-Service (PaaS) offering that is used by Software-as-a-Service (SaaS) applications in the cloud.

In the system model, each server node represents a replica of a database. When a query (job) arrives, a dispatcher immediately assigns the query to a server among multiple servers, according to certain dispatching policy; for each server, a resource scheduling policy decides which query to execute first, among those waiting in the associated queue; and a capacity planning component is in charge of determining how many resources (i.e., database servers) to be allocated in the system. With this abstraction, the system optimizes three tasks: query dispatching, resource scheduling, and capacity planning The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer with digital signal processing capability to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to consolidate workload on cloud-based computers, comprising:
co-locating one or more high-penalty tenants on one or more cloud-based servers;
reducing by one or more computers service level agreement (SLA) violations by over-provisioning the one or more cloud-based servers; and
maximizing by one or more computers an SLA profit by filling a baseline case in a dynamic programming table with $MTC[i, 1] = ExpPenalty(1,i)$, $1 \leq i \leq N$ and with filled up cells in the dynamic programming table, determining $MTC[i, j] = \min[MTC[k, j-1] + ExpPenalty(k+1, i)]$ and for each cell, storing a set of tenants to put in server (j-th) as $PrevCut[i, j]$, wherein $MTC[i, j]$ is a minimum total cost possible when placing i tenants on j servers, $PrevCut[i, j]$ represents where a previous cut is for the setup that realizes the minimum total cost and ExpPenalty represents an expected penalty, wherein i, j, k are incremental variables and N is the total number of servers.

2. The method of claim 1, comprising:
generating an expected penalty estimation, and
placing the high penalty tenants to minimize a total expected penalty.

3. The method of claim 2, wherein the placing of tenants comprises dynamic programming.

4. The method of claim 2, comprising applying a P-MAX (Profit-MAXimizing tenant placement) policy for tenant placement.

5. The method of claim 4, comprising constructing a table of MTC[i,j], wherein each cell stores a minimum total cost for i tenants and j servers, and wherein MTC[N,j] stores an expected penalty cost when j servers serve N tenants.

6. The method of claim 5, comprising determining the best capacity size by subtracting operational costs associated with j servers from the expected penalty cost.

7. The method of claim 1, comprising:
generating an M×N table,
determining MTC[N, j] as a minimum SLA penalty for placing N tenants onto j servers; and
determining the SLA profit for placing N tenants onto j servers with:

$$SLAProfit_N[j] = SLARevenue(N, j) - OpCost(j)$$
$$= SLAIncome(N) - MTC[N, j] - OpCost(j)$$

wherein SLAIncome(N) is a sum of SLA incomes from all tenants' queries, regardless of placement, and OpCost(j) is an operational cost for using j servers.

8. The method of claim 7, comprising:
determining a new $SLAProfit_N[j]$;
checking if $SLAProfit_N[j]$ has increased compared to $SLAProfit_N[j-1]$; and
if $SLAProfit_N[j] < SLAProfit_N[j-1]$, selecting j−1 as the best capacity size.

9. The method of claim 1, comprising determining an aggregated load distribution for the server.

10. The method of claim 9, comprising determining a mean ($\mu$) as a sum of loads from all tenants, and a variance ($\sigma^2$) is a sum of load variances of all tenants.

11. A method to consolidate workload on cloud-based computers, comprising:
generating an expected penalty estimation and placing tenants to minimize a total expected penalty;
co-locating one or more high-penalty tenants on one or more cloud-based servers;
reducing service level agreement (SLA) violations by over-provisioning the cloud-based server; and
maximizing an SLA profit by one or more computers by filling a baseline case in a dynamic programming table with MTC[i, 1]=ExpPenalty (1,i), 1<i<N and with filled up cells in the dynamic programming table, determining MTC[i, j]=min[MTC[k, j−1]+ExpPenalty (k+1, i)] and for each cell, storing a set of tenants to put in server (j-th) as PrevCut[i, j], wherein MTC[i, j] is a minimum total cost possible when placing i tenants on j servers, PrevCut[i, j] represents where a previous cut is for the setup that realizes the minimum total cost and ExpPenalty represents an expected penalty, wherein i, j, k are incremental variables and N is the total number of servers.

12. The method of claim 11, comprising:
generating an M×N table;
determining MTC[N, j] as a minimum SLA penalty for placing N tenants onto j servers; and
determining the SLA profit for placing N tenants onto j servers as:

$$SLAProfit_N[j] = SLARevenue(N, j) - OpCost(j)$$
$$= SLAIncome(N) - MTC[N, j] - OpCost(j)$$

wherein SLAIncome(N) comprises a sum of SLA incomes from all tenants' queries, regardless of placement, and OpCost(j) comprises an operational cost for using j servers;
determining a new $SLAProfit_N[j]$;
checking if $SLAProfit_N[j]$ has increased compared to $SLAProfit_N[j-1]$; and
if $SLAProfit_N[j] < SLAProfit_N[j-1]$, selecting j−1 as the best capacity size.

13. A workload management system for cloud-based computers, comprising:
one or more cloud-based servers to co-locate one or more high-penalty tenants;
means for reducing service level agreement (SLA) violations by over-provisioning the cloud-based servers; and
means for maximizing an SLA profit by filling a baseline case in a dynamic programming table with MTC[i, 1]=ExpPenalty (1,i), 1<i<N and with filled up cells in the dynamic programming table, determining MTC[i, j]=min[MTC[k, j−1]+ExpPenalty (k+1, i)] and for each cell, storing a set of tenants to put in server (j-th) as PrevCut[i, j], wherein MTC[i, j] is a minimum total cost possible when placing i tenants on j servers, PrevCut[i, j] represents where a previous cut is for the setup that realizes the minimum total cost and ExpPenalty represents an expected penalty, wherein i, j, k are incremental variables and N is the total number of servers.

14. The system of claim 13, comprising means for generating an expected penalty estimation, and placing tenants to minimize a total expected penalty.

15. The system of claim 14, wherein the means for placing of tenants comprises dynamic programming means.

16. The system of claim 14, comprising means for applying a P-MAX (Profit-MAXimizing tenant placement) policy for tenant placement.

17. The system of claim 16, comprising means for constructing a table of MTC[i,j], wherein each cell stores a minimum total cost for i tenants and j servers, and wherein MTC[N,j] stores an expected penalty cost when j servers serve N tenants.

18. The system of claim 17, comprising means for determining the best capacity size by subtracting operational costs associated with j servers from the expected penalty cost.

19. The system of claim 13, comprising:
means for generating an M×N table,
means for determining MTC[N, j], as a minimum SLA penalty for placing N tenants onto j servers; and
means for determining the SLA profit for placing N tenants onto j servers with:

$$SLAProfit_N[j] = SLARevenue(N, j) - OpCost(j)$$
$$= SLAIncome(N) - MTC[N, j] - OpCost(j)$$

where SLAIncome(N) is a sum of SLA incomes from all tenants' queries, regardless of placement, and OpCost(j) is an operational cost for using j servers.

20. The system of claim 19, comprising means for determining a new $SLAProfit_N[j]$, checking if $SLAProfit_N[j]$ has increased compared to $SLAProfit_N[j-1]$; and if $SLAProfit_N[j] < SLAProfit_N[j-1]$, selecting j−1 as the best capacity size.

* * * * *